United States Patent [19]

Segal et al.

[11] Patent Number: 4,731,441

[45] Date of Patent: Mar. 15, 1988

[54] WATER-SOLUBLE AZO COMPOUNDS CONTAINING, AS FIBER-REACTIVE GROUPS, A (NITROPHENYLAMINO-PHENYLAMINO)-CHLORO-TRIAZINYLAMINO GROUP AND GROUPS OF THE VINYLSULFONE SERIES, SUITABLE AS DYESTUFFS

[75] Inventors: Marcos Segal; Michael Kunze, both of Hofheim am Taunus, Fed. Rep. of Germany

[73] Assignee: Hoechst Aktiengesellschaft, Frankfurt am Main, Fed. Rep. of Germany

[21] Appl. No.: 841,542

[22] Filed: Mar. 19, 1986

[30] Foreign Application Priority Data

Mar. 21, 1985 [DE] Fed. Rep. of Germany ....... 3510179

[51] Int. Cl.[4] .................. C09B 62/026; C09B 62/507; D06P 1/38; D06P 3/10
[52] U.S. Cl. ................................. 534/637; 534/593; 534/598; 534/617; 534/632; 534/636; 534/638; 534/642; 534/887
[58] Field of Search ............... 534/638, 642, 637, 636, 534/617

[56] References Cited

FOREIGN PATENT DOCUMENTS

| | | | |
|---|---|---|---|
| 0048355 | 3/1982 | European Pat. Off. | 534/638 |
| 0094055 | 11/1983 | European Pat. Off. | 534/642 |
| 1179317 | 10/1964 | Fed. Rep. of Germany | 534/638 |
| 57-42986 | 3/1982 | Japan | 534/638 |
| 58-46185 | 3/1983 | Japan | 534/638 |
| 58-46186 | 3/1983 | Japan | 534/638 |
| 1013442 | 12/1965 | United Kingdom | 534/638 |

Primary Examiner—Floyd D. Higel

[57] ABSTRACT

Water-soluble monoazo and disazo compounds having fiber-reactive dye properties which are suitable for dyeing carbamoyl- and hydroxyl-containing materials, in particular cellulose fiber materials, and containing as diazo components an optionally substituted phenyl radical or naphthyl radical or a phenylazophenyl, phenylazonaphthyl, naphthylazophenyl or naphthylazonaphthyl radical, one of these radicals containing bonded in the diazo component a vinylsulfonyl, $\beta$-thiosulfatoethylsulfonyl, $\beta$-phosphatoethylsulfonyl, $\beta$-chloroethylsulfonyl or $\beta$-sulfatoethylsulfonyl group, and as coupling component that of a naphthol, aminonaphthaline or aminobenzene having a fiber-reactive grouping of the general formula

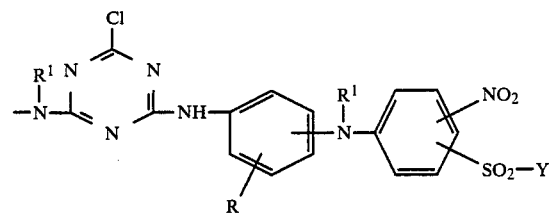

in which the two $R^1$s, identical to or different from each other, denote a hydrogen atom or an optionally substituted alkyl group of 1 to 4 carbon atoms, R is a hydrogen atom or a sulfo group and Y represents the vinyl group, a $\beta$-thiosulfatoethyl, $\beta$-phosphatoethyl, $\beta$-chloroethyl or $\beta$-sulfatoethyl group.

18 Claims, No Drawings

WATER-SOLUBLE AZO COMPOUNDS CONTAINING, AS FIBER-REACTIVE GROUPS, A (NITROPHENYLAMINO-PHENYLAMINO)-CHLORO-TRIAZINYLAMINO GROUP AND GROUPS OF THE VINYLSULFONE SERIES, SUITABLE AS DYESTUFFS

The invention is in the technical field of fiber-reactive dyes.

European Patent Application Publication No. 0,094,055A and Japanese Patent Application Publication Nos. Sho-57-42,986, Sho-58-46,185 and Sho-58-46,186 disclose fiber-reactive azo dyes which contain a fiber-reactive radical from the vinylsulfonyl series and a further fiber-reactive radical from the monochlorotriazinyl series. However, the dyes described have certain defects, such as, for example, insufficient wet light and perspiration light fastness propertie.

The present invention, then, provides new valuable watersoluble azo compounds which conform to the general formula (1)

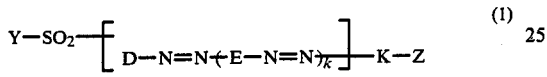

In this formula the symbols have the following meanings:

k is the number zero or 1;

the —$SO_2$—Y group is mandatorily bonded to a carbon atom of an aromatic nucleus of D or of an aromatic nucleus of E or of a benzene nucleus of the substituent of D;

D is the phenyl radical which may be substituted by 1, 2 or 3 substituents which preferably belong to the group of substituents consisting of alkyl of 1 to 4 carbon atoms, such as methyl and ethyl, alkoxy of 1 to 4 carbon atoms, such as methoxy and ethoxy, carboxyl, alkanoylamino of 2 to 5 carbon atoms which may be substituted, of which preferably for ex. acetylamino, optionally substituted benzoylamino, of which in particular benzoylamino and sulfobenzoylamino, phenylamino, sulfophenylamino, carbamoyl, carbamoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenyl-sulfamoyl, N-phenyl-N-($C_1$–$C_4$-alkyl)-sulfamoyl, cyano, nitro, chlorine, bromine, fluorine, trifluoromethyl, hydroxyl and sulfo, or D is a naphthyl radical which may be substituted by 1, 2 or 3 substituents which preferably belong to the group of substituents consisting of sulfo, carboxyl, methyl, ethyl, methoxy, ethoxy, alkanoylamino of 2 to 5 carbon atoms which may be substituted, of which preferably for ex. acetylamino, optionally substituted benzoylamino, of which in particular benzoylamino and sulfobenzoylamino, chlorine, hydroxyl and nitro, or D is the phenyl radical which may be substituted by the —$SO_2$—Y group shown and further by 1 or 2 substituents which preferably belong to the group of substituents consisting of alkyl of 1 to 4 carbon atoms, such as methyl and ethyl, alkoxy of 1 to 4 carbon atoms, such as methoxy and ethoxy, carboxyl, alkanoylamino of 2 to 5 carbon atoms which may be substituted, of which preferably for ex. acetylamino, optionally substituted henzoylamino, of which in particular benzoylamino and sulfobenzoylamino, phenylamino, sulfophenylamino, carbamoyl, carbamoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenyl-sulfamoyl, N-phenyl-N-($C_1$–$C_4$-alkyl)-sulfamoyl, cyano, nitro, chlorine, bromine, fluorine, trifluoromethyl, hydroxyl and sulfo, or D is a naphthyl radical which may be substituted by the —$SO_2$—Y group shown and further by 1 or 2 substituents which belong to the group of substituents consisting of sulfo, carboxyl, methyl, ethyl, methoxy, ethoxy, alkanoylamino of 2 to 5 carbon atoms, which may be suhstituted, of which preferably such as acetylamino, optionally substituted benzoylamino and sulfobenzoylamino, chlorine, hydroxyl and nitro;

E is the radical of a couplable and diazotizable compound which in the synthesis of compounds (1) serves first as a coupling component and then as a diazo component, and represents a phenylene radical, preferably 1,4-phenylene radical, which may be substituted by one or two substituents which are selected from the set consisting of 2 alkyl of 1 to 4 carbon atoms, 2 alkoxy of 1 to 4 carbon atoms, 2 chlorine, 1 bromine, alkanoylamino of 2 to 5 carbon atoms, which may be substituted, of which preferably for ex. acetylamino, 1 benzoylamino, 2 sulfo, 1 carboxyl, 1 N,N-dialkylamino having alkyl groups of 1 to 4 carbon atoms each, such as dimethylamino and diethylamino, 1 ureido, 1 phenylureido and 1 alkylsulfonylamino of 1 to 4 carbon atoms, or denotes a naphthylene radical, such as, for example, the 1,4-naphthylene radical, which may be substituted by 1 or 2 sulfo groups or by an alkyl group of 1 to 4 carbon atoms, a nitro group, an alkanoylamino group of 2 to 5 carbon atoms, such as an acetylamino group, or a benzoylamino group or the —$SO_2$—Y group shown or by 1 or 2 sulfo groups and the —$SO_2$—Y group shown or which may be substituted by the —$SO_2$—Y group shown and 1 or 2 sulfo groups and an alkyl group of 1 to 4 carbon atoms, a nitro group, an alkylamino group of 2 to 5 carbon atoms or a benzoylamino group, or represents a naphthylene radical which contains bonded in the orthoposition relative to the azo group which is also linked with D, an amino group, an alkylamino group of 1 to 4 carbon atoms or an optionally (for example by chlorine, alkyl of 1 to 4 carbon atoms, alkoxy of 1 to 4 carbon atoms, sulfo and/or carboxyl) substituted phenylamino group or a hydroxyl group and which may be substituted by 1 or 2 sulfo groups or an alkyl group of 1 to 4 carbon atoms, a nitro group or an alkanoylamino group of 2 to 5 carbon atoms, such as an acetylamino group, or by 1 or 2 sulfo groups and an alkyl group of 1 to 4 carbon atoms, a nitro or alkanoylamino group of 2 to 5 carbon atoms, such as an acetylamino group;

K is a 1-hydroxynaphthylene radical which contains bonded in the 2-position the azo group or is a 2-hydroxynaphthylene radical which contains bonded in the 1-position the azo group, both of which may be substituted by 1 or 2 sulfo groups or by an optionally substituted alkanoylamino group of 2 to 5 carbon atoms or a benzoylamino group or by 1 or 2 sulfo groups and an optionally substituted alkanoylamino group of 2 to 5 carbon atoms or a benzoylamino group, or K is a naphthylene radical which may or preferably is substituted by 1 or 2 sulfo groups, or may be substituted by 1 or 2 sulfo groups and an optionally mono-substituted or disubstituted amino group, the substituents of the amino groups belonging to the groups of substituents consisting of alkyl of 1 to 4 carbon atoms, hydroxyalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyl radicals of 1 to 4 carbon atoms each, phenylalkyl having an alkyl radical of 1 to 4 carbon atoms, it being possible for the phenyl radical to be substituted by methyl, ethyl, methoxy, ethoxy, chlorine, sulfo and/or carboxyl, phenyl and phenyl which is substituted by alkyl of 1 to 4 carbon atoms, alkoxy of 1 to 4 carbon atoms, chlorine, carboxyl and/or sulfo, or K is a 1-aminonaphthylene radical which contains bonded in the 2-position the azo group or is a 2-aminonaphthylene radical which contains bonded in the 1-position the azo group, it being possible or even preferable for the two aminonaphthylene radicals to be substituted by 1 or 2 sulfo groups or by a hydroxyl group in the 5-, 6-, 7- or 8-position or by this hydroxyl group and 1 or 2 sulfo groups, or K is a phenylene radical, such as the 1,3- or 1,4-phenylene radical, which may be substituted by 1 or 2 substituents which belong to the group of substituents consisting of 2 alkyl of 1 to 4 carbon atoms, 2 alkoxy of 1 to 4 carbon atoms, 2 chlorine, 1 bromine, 1 alkanoylamino of 2 to 5 carbon atoms which may be substituted, of which preferably acetylamino, 1 benzoylamino, 1 sulfo, 1 carboxyl, 1 ureido, 1 phenylureido, 1 alkylsulfonylamino of 1 to 4 carbon atoms, 1 amino and 1 monosubstituted or disubstituted amino whose substituents are alkyl of 1 to 4 carbon atoms, hydroxyalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyl radicals of 1 to 4 carbon atoms each, phenylalkyl having an alkyl radical of 1 to 4 carbon atoms, whose phenyl radical may be substituted by methyl, ethyl, methoxy, ethoxy, chlorine, carboxyl and/or sulfo, phenyl and phenyl which is substituted by alkyl of 1 to 4 carbon atoms, alkoxy of 1 to 4 carbon atoms, chlorine, carboxyl and/or sulfo, of which for ex. alkylamino of 1 to 4 carbon atoms, such as methylamino and ethylamino, and N,N-dialkylamino having alkyl groups of 1 to 4 carbon atoms each, such as dimethylamino and diethylamino;

Y is the vinyl group or a β-thiosulfatoethyl group, a β-phosphatoethyl group, a β-chloroethyl group or preferably a β-sulfatoethyl group;

Z is a radical of the general formula (3)

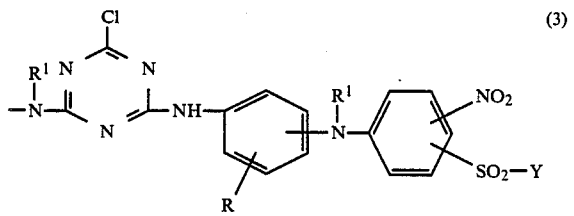

(3)

in which

R$^1$ stands for a hydrogen atom or an optionally substituted alkyl group of 1 to 4 carbon atoms, it being possible for the two R$^1$s to be identical to or different from each other, R denotes a hydrogen atom or a sulfo group and Y has the abovementioned meaning, it being possible for the two Ys to be identical to or different from each other.

Preference is given to compounds of the general formula (2)

$$Y-SO_2-D_1-N=N-(E_1-N=N)_{\overline{k}}K-Z \qquad (2)$$

in which

D$_1$ is a phenylene radical which may be substituted by 1 or 2 substitutes which belong to the group of substituents consisting of alkyl 1 to 4 carbon atoms, such as methyl and ethyl, alkoxy of 1 to 4 carbon atoms, such as methoxy and ethoxy, carboxyl, alkanoylamino of 2 to 5 carbon atoms which may be substituted, of which preferably for ex. acetylamino, optionally substituted benzoylamino, of which in particular benzoylamino and sulfobenzoylamino, phenylamino, sulfophenylamino, carbamoyl, carbomoyl which is monosubstituted or disubstituted by alkyl of 1 to 4 carbon atoms, sulfamoyl, sulfamoyl which is monosubstituted or disubstituted by alkyl of 1 to 4 carbon atoms, N-phenylsulfamoyl, N-phenyl-N-(C$_1$-C$_4$-alkyl)-sulfamoyl, cyano, nitro, chlorine, bromine, fluorine, trifluoromethyl, hydroxy and sulfo, or D$_1$ is a naphthylene radical which may be substituted by 1 or 2 substituents which belong to the group of substituents consisting of sulfo, carboxyl, methyl, ethyl, methoxy, ethoxy, alkanoylamino of 2 to 5 carbon atoms which may be substituted, of which preferably for ex. acetylamino, optionally substituted benzoylamino, of which in particular benzoylamino, and sulfobenzoylamino, chlorine, hydroxyl and nitro, and E$_1$ is the radical of a couplable and diazotizable compound which in the synthesis of compounds (1) serves first as a coupling component and then as a diazo component, and represents a phenylene radical, preferably 1,4-phenylene radical, which may be substituted by one or two substituents which are selected from the set consisting of 2 alkyl of 1 to 4 carbon atoms, 2 alkoxy of 1 to 4 carbon atoms, 2 chlorine, 1 bromine, 1 alkanoylamino of 2 to 5 carbon atoms which may be substituted, of which preferably acetylamino, 1 benzoylamino, 2 sulfo, 1 carboxyl, 1 N,N-dialkylamino having alkyl groups of 1 to 4 carbon atoms each, such as dimethylamino and diethylamino, 1 ureido, 1 phenylureido and 1 alkylsulfonylamino of 1 to 4 carbon atoms, or denotes a naphthylene radical, such as, for example, the 1,4-naphthylene radical which may be substituted by 1 or 2 sulfo groups or by an alkyl group of 1 to 4 carbon atoms, a nitro group, an alkanoylamino group of 2 to 5 carbon atoms, such as an acetylamino group, or a benzoylamino group or by 1 or 2 sulfo groups and an alkyl group of 1 to 4 carbon atoms, a nitro group, an alkanoylamino group of 2 to 5 carbon atoms or a benzoylamino group, or represents a naphthylene radical which contains bonded in the ortho-position relative to the azo group which is also linked with D, an amino group, an alkylamino group of 1 to 4 carbon atoms or an optionally (for example by chlorine, alkyl of 1 to 4 carbon atoms, alkoxy of 1 to 4 carbon atoms, sulfo and/or carboxyl) substituted phenylamino group or a hydroxyl group and which is substituted by no further substituents or is additionally substituted by 1 or 2 sulfo groups or an alkyl group of 1 to 4 carbon atoms, a nitro group, an optionally substituted alkanoylamino group of 2 to 5 carbon atoms, such as acetylamino group, or a benzoylamino group or by 1 or 2 sulfo groups and an alkyl group of 1 to 4 carbon atoms, a nitro group, an optionally substituted alkanoylamino group of 2 to 5 carbon atoms, such as a acetylamino group, or a benzoylamino group, and K, Y, Z and k have the meanings specified for the formula (1).

Heretofore and hereinafter sulfo groups denote groups conforming to the general formula —$SO_3M$ in which M is a hydrogen atom or an alkali metal, such as sodium, potassium or lithium, or the equivalent of an alkaline earth metal, such as calcium, or preferably a hydrogen atom and in particular an alkali metal, also carboxyl groups groups of the general formula —COOM, phosphato groups groups of the general formula —$OPO_3M_2$, thiosulfato groups groups of the general formula —$S13\ SO_3M$ and sulfato groups groups of the general formula —$OSO_3M$, with M having the abovementioned meaning in each case.

The azo compounds according to the invention can be present in the form of their free acids and preferably in the form of their salts, in particular neutral salts; salts to be mentioned in particular are the alkali metal salts. The new compounds are preferably in the form of these salts when finding utility for dyeing and printing hydroxy- and/or carboxamide-containing fiber material.

Substituents in substituted alkanoylamino groups of 2 to 5 carbon atoms are for example chlorine, bromine, sulfo, sulfato, carboxyl and hydroxyl. Alkyl groups of 1 to 4 carbon atoms which are substituted are for example those which are substituted by 1 or 2, preferably 1, substituent from the group consisting of acetylamino, hydroxyl, sulfato, alkoxy of 1 to 4 carbon atoms, sulfo and carboxyl.

Preferably the formula residues $R^1$ are a hydrogen atom or an alkyl group of 1 to 4 carbon atoms, such as in particular the methyl or ethyl group. Preferably, Z is a group of the formula —NH—$Z^2$ mentioned and defined later. Preferably D is a monosulfo- or disulfophenyl or a mono- sulfo-, disulfo- or trisulfonaphthyl radical or a benzene radical of the general formula (4)

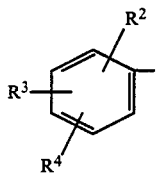

(4)

in which $R^2$ denotes a bromine atom, a nitro group or an alkanoylamino group of 2 to 5 carbon atoms, such as the acetylamino group, but preferably a hydrogen atom, an alkyl group of 1 to 4 carbon atoms, such as the ethyl group and in particular the methyl group, an alkoxy group of 1 to 4 carbon atoms, such as the ethoxy group and in particular the methoxy group, a chlorine atom, or a carboxyl group, $R^3$ is a bromine atom or a hydroxyl group, but preferably a hydrogen atom, an alkyl group of 1 to 4 carbon atoms, such as the ethyl group and in particular the methyl group, an alkoxy group of 1 to 4 carbon atoms, such as the ethoxy group and in particular the methoxy group, a chlorine atom, or a salfo group and $R^4$ denotes a hydrogen atom or preferably a sulfo group.

However, particularly preferably the formula residue D is the phenyl radical which is substituted by the —$SO_2$—Y group shown and may be further substituted by 1 or 2 substituents from the group consisting of alkyl of 1 to 4 carbon atoms, alkoxy of 1 to 4 carbon atoms, chlorine, carboxyl and sulfo. Preferably D is further a naphthyl radical which is substituted by the —$SO_2$—Y group shown and may be further substituted by 1 or 2 sulfo groups. If k stands for the number 1, the E is preferably a 1-hydroxynaphthylene radical which contains the D—N=N— azo radical bonded in the 2-position and is subsituted by 1 or 2 sulfo groups, or the 1–4 phenylene radical which may be substituted by an amino group, an alkylamino group of 1 to 4 carbon atoms, an alkanoylamino group of 2 to 5 carbon atoms, such as an acetylamino group, a methyl, ethyl, carboxyl, sulfo or ureido group or a chlorine atom or by one of these substituents and by a methyl, ethyl, methoxy, ethoxy or sulfo group or a chlorine atom, or is a 1,4-naphthylene radical which may be substituted by an alkanoylamino group of 2 to 5 carbon atoms or a benzoylamino group and/or 1 or 2 sulfo groups.

Preferably D is further in particular a radical of the general formula (4b), (4c) and (4d)

(4b)

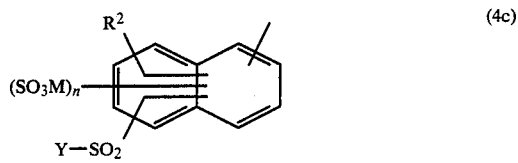

(4c)

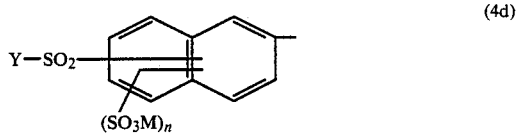

(4d)

in which $R^2$, $R^3$, M and Y have the abovementioned meanings and n stands for number 1 and 2, in the formula (4d) the index n being preferably 1.

The above substituents $R^2$, $R^3$ and $R^4$ can be identical to or different from one another.

The present invention further concerns processes for preparing the azo compounds of the formula (1). These can be prepared according to the invention by reacting a compound of the general formula (5)

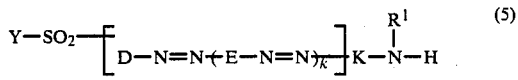

(5)

(where D, E, K, Y, k and $R^1$ have the abovementioned meanings and which can be prepared in a perfectly conventional and known manner of diazotizing and coupling the corresponding components) with a dichlorotriazine compound of the general formula (6)

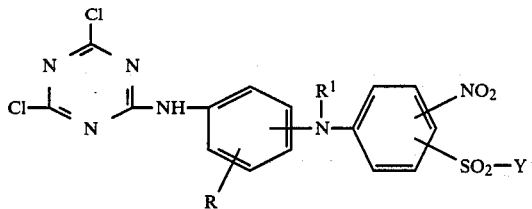    (6)

(in which $R^l$, R and Y have the abovementioned meanings) with elimination of one mole of hydrogen chloride, or by reacting a compound of the general formula (7)

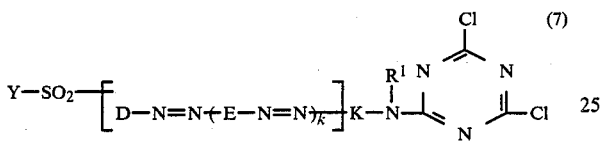    (7)

(where D, E, K, Y, k and $R^l$ have the abovementioned meanings and which can be prepared in a perfectly conventional manner by reacting the compound (5) with 2,4,6-trichloro-s-triazine (cyanuric chloride)) with an aminodiphenylamine compound of the general formula (8)

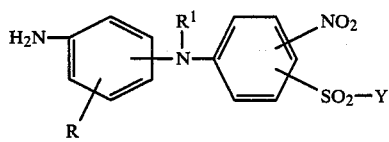    (8)

(in which $R^1$, R and Y have the abovementioned meanings) with elimination of one mole of hydrogen chloride.

The variant of the process of the invention for reacting a compound of the general formula (5) with a compound of the general formula (6) can be carried out in an aqueous organic medium; it is preferably carried out in aqueous solution. The reaction temperature is in general between 0° and 50° C., preferably between 25° and 45° C., in particular between 35° and 40° C. In general, a pH value between 4 and 8, preferably between 5 and 7, is maintained.

The condensation reaction of an aminoazo compound of the general formula (5) with cyanuric chloride to starting compound (7) is in general effected in an aqueous, neutral to acid solution at a temperature between −10° C. and +20° C., preferably at a temperature between 5° and 10° C. and at a pH value of 4 to 6. The condensation reaction according to the invention of the dichlorotriazine-azo compound of the general formula (7) with the aminodiphenylamine compound of the general formula (8) is generally effected subsequently, preferably without further isolation of the previously prepared compound (7) from the reaction batch, in an aqueous organic solution, preferably aqueous, neutral to acid solution in general at a temperature between 0° and 50° C., preferably between 10° and 40° C., and preferably at a pH value between 3 and 7, in particular between 6 and 6.5.

The diazo components conforming to a general formula $Y—SO_2—D—NH_2$ and $Y—SO_2—D—N=N—E_1—NH_2$ which serve to prepare the starting compounds of the general formulae (5) or (7) are for example compounds of the general formulae (9a) to (9h)

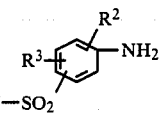    (9a)

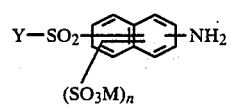    (9b)

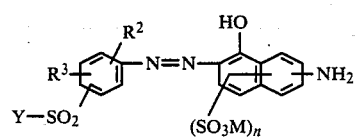    (9c)

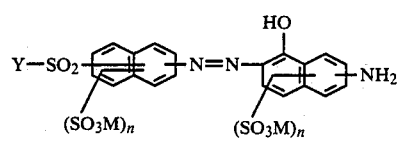    (9d)

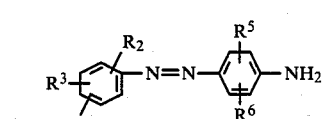    (9e)

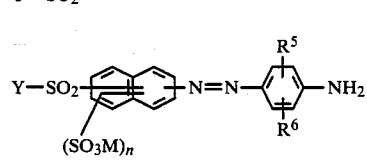    (9f)

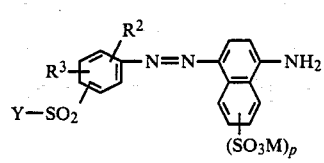    (9g)

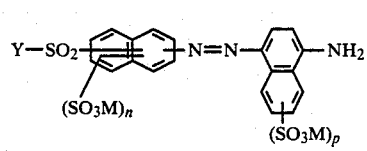    (9h)

in which
M, $R^2$, $R^3$ and Y have the abovementioned meanings,
n denotes number 1 or 2,
p is the number zero, 1 or 2,
$R^5$ is a hydrogen atom, a sulfo group, an alkyl group of 1 to 4 carbon atoms, such as the ethyl group and in particular the methyl group, an alkoxy group of 1 to 4 carbon atoms, such as the ethoxy group and in particular methoxy group, a chlorine atom or a bromine atom,
$R^6$ denotes a hydrogen atom, a sulfo group, an alkyl group of 1 to 4 carbon atoms, such as the ethyl group and in particular methyl group, an alkoxy group of 1 to 4 carbon atoms, such as the ethoxy group and in particular methoxy group, a chlorine atom, a bromine atom, an alkanoylamino group, such as the acetylamino group, the amino group, an alkylamino group of 1 to 4 carbon atoms, a dialkylamino group having alkyl radicals of 1 to 4 carbon atoms each, the ureido group or an alkylsulfonylamino group of 1 to 4 carbon atoms, and the diazotizable amino group in the formulae (9c) and (9d) is bonded in the 5-, 6- or 7-position of the 1-naphthol radical.

Coupling components of the general formula H-K-NHR$^1$ where K and R$^1$ have the abovementioned meanings, which can serve for preparing the starting compounds of the general formulae (5) and (7), are for example compounds of the general formulae (10a), (10b) and (10c)

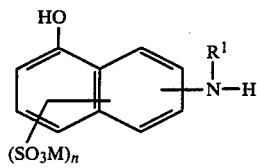

(10a)

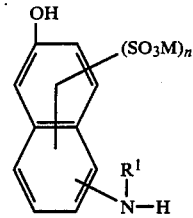

(10b)

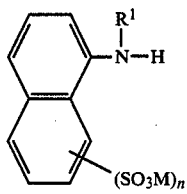

(10c)

in which M, R$^1$ and n have the abovementioned meanings.

Combinations of the abovementioned diazo components conforming to the general formulae (9) and the coupling components of the general formulae (10) with the radical of the cyanuric chloride and the radical of the aminodiphenylamine of the general formula (8) or with the dichlorotriazinylaminodiphenylamine radical of the general formula (7) give rise to preferred mono-azo and disazo compounds of the general formula (2).

The new azo compounds of the general formula (1) can in some instances also be prepared according to the invention by coupling a diazonium compound of an amine of the general formula (11)

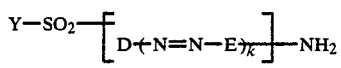

which Y, D, E and k have the meanings given for formula (1) with a couplable compound of the general formula H—K—Z where K and Z have the abovementioned meaning. The precondition of this is, as is familiar to the person skilled in the art, that the fiber-reactive group Z, as an acylamino radical, is not bonded in a position of the coupling component H—K—Z which hinders the coupling, such as, for ex. not a naphthalene-sulfonic acid substituted by Z in the 1-position. Those suitable coupling components of the general formula H—K—Z are for example compounds of the general formula (12a) to (12e).

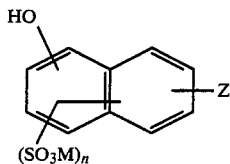

(12a)

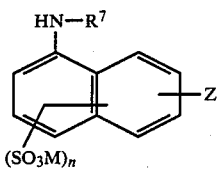

(12b)

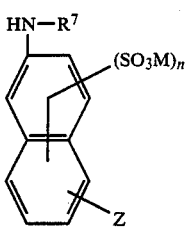

(12c)

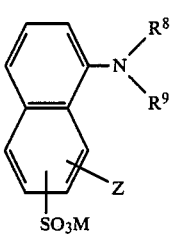

(12d)

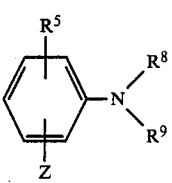

(12e)

in which
M, Z, R$^5$ and n have the abovementioned meanings,

R$^7$ stands for a hydrogen atom, an alkyl group of 1 to 4 carbon atoms or a phenyl radical which may be substituted by chlorine, methyl, ethyl, methoxy, ethoxy, sulfo and/or carboxyl, R$^8$ denotes a hydrogen atom or an alkyl group of 1 to 4 carbon atoms which may be substituted by a hydroxyl, carboxy, sulfo, sulfato, carbomethoxy or carbethoxy group, and R$^9$ is a hydrogen atom or an alkyl group of 1 to 4 carbon atoms which may be subsituted by a hydroxyl, cyano, carboxyl, sulfo, sulfato, carbomethyoxy or carbethoxy group or a phenyl radical, or is a phenyl aedical which can be substituted by alkyl of 1 to 4 carbon atoms, alkoxy of 1 to 4 carbon atoms, chlorine and/or sulfo, the radical Z preferably being bonded in formula (12e) in the meta-position relative to the amino group —NR$^8$R$^9$.

The starting compounds of the general formulae (12) can be prepared in a perfectly conventional manner from the aminonaphthalene and aniline compounds in which the amino group is present in place of the formula residue Z in the formulae (12), together with cyanuric chloride and the aminodiphenylamine compound of the general formula (8). For instance, the synthesis of the compounds of the general formula H—K—Z is effected by reaction of a compound of the general formula H—K—NHR$^1$ with a dichlorotriazinylaminodiphenylamine compound of the general formula (6) in an aqueous organic or preferably aqueous medium at a temperature between 10° and 20° C. and at a pH value between 6 and 6.5.

If the abovementioned condensation reactions between the amino compounds and cyanuric chloride or a dichlorotriazinylamino compound and an amino compound is effected in an aqueous organic medium, the organic solvent in question is preferably acetone, dioxane and dimethylformamide.

One of the aminodiphenylamine compounds of the general formula (8) serving as starting compounds is known in the form of its β-hydroxyethylsulfonyl precursor (see German Auslegeschrift No. 1,179,317, Example 5). Other aminodiphenylamine compounds of the formula (8) can easily be prepared analogously via this β-hydroxyethylsulfonyl precursor by means of the corresponding isomeric acylaminoaniline and (β-hydroxyethylsulfonyl)-nitrochlorobenzene compounds. For instance, 4-amino-2'-(β-hydroxyethylsulfonyl)-5'-nitrodiphenylamine is obtained by reaction of 1,4-phenylenediamine and 2-chloro-5-nitrophenyl β-hydroxyethyl sulfone in methanolic solution at a temperature between 50° and 70° C. in the course of a few hours, which after cooling down to room temperature and addition of ice-water separates out from the reaction solution in crystals in high yield.

From these β-hydroxyethylsulfonyl-substituted aminodiphenylamine starting compounds the fiber-reactive starting compounds of the general formula (8) can be synthesized in the manner customary for the synthesis of fiber-reactive groups of the vinylsulfonyl series. Preferably they are first converted into their sulfato derivatives by reaction with a sulfating agent analogously to known methods. Sulfating agents are for example 96 to 100% strength or SO$_3$— containing sulfuric acid or chlorosulfonic acid in an organic solvent, such as pyridine or N-methylpyrrolidone. Analogous sulfating reactions of this kind are known for example from the previously cited German Auslegeschrift No. 1,179,317 and from British Patent Specification No. 1,540,566 and European Patent Application Publication No. 0,036,383. Preferably the sulfation of the β-hydroxyethylsulfonyl starting compound to the corresponding compound of the general formula (8) in which Y stands for the β-sulfatoethyl group is effected in 100% strength sulfuric acid at temperatures between 10° and 30° C. From this, the water-soluble and sulfuric acid-soluble sulfato compound can be isolated after addition of the sulfuric acid solution to ice-water.

The same method can be used to prepare the compounds of the general formula (8) in which Y stands for the β-phosphatoethyl group by reaction with a suitable and customary phosphating agent, such as phosphoric acid, polyphosphoric acid or phosphorous pentachloride.

The β-sulfatoethylsulfonyl compounds of the general formula (8) can be used to prepare the corresponding vinylsulfonyl compounds (where Y is equal to the vinyl group in formula (8)) by reaction with an alkali in aqueous solution, for example by treating a solution of the sulfato compound in alkaline aqueous solution at a pH value between 8 and 10 and at a temperature between about 40° and 60° C. for a short time.

These vinylsulfonyl compounds of the general formula (8) can be used to prepare the corresponding β-thiosulfatoethylsulfonyl compounds by reaction with an alkali metal thiosulfate, for example by reacting the vinylsulfonyl compound of the formula (8) with sodium thiosulfate, advantageously in excess, such as an excess of 21–40% in aqueous weakly acid solution at a temperature between 30° and 80° C.

Aminodiphenylamine starting compounds of the general formula (8) are for example 1-nitro-2-(4'-aminophenylamino)-5-(β-sulfatoethylsulfonyl)-benzene, 1-nitro-4-(4'-aminophenylamino)-5-(β-sulfatoethylsulfonyl)-benzene, 1-nitro-2-(3'-aminophenylamino)-5-(β-sulfatoethylsulfonyl)-benzene, 1-nitro-2-(4'-amino-3'sulfophenylamino)-5-(β-sulfatoethylsulfonyl)-benzene and 1-nitro-2-(4'-amino-2'-sulfophenylamino)-5-(β-sulfatoethylsulfonyl)-benzene.

Aromatic amines of the general formulae D—NH$_2$ and Y—SO$_2$—D$_1$—NH$_2$ which can serve as diazo components for synthesizing the compounds according to the invention, are for example 1-aminobenzene-2-sulfonic acid, 1-aminobenzene-3- and -4-sulfonic acid, 2-amino-4-sulfobenzoic acid, 2-amino-5-sulfobenzoic acid, 4-amino-2-sulfobenzoic acid, 4-aminotoluene-2- and -3-sulfonic acid, 2-aminotoluene-4- and -5-sulfonic acid, 2-aminotoluene-4-carboxylic acid, anthranilic acid, 4-aminobenzoic acid, 2-aminoanisole-4- and -5-sulfonic acid, 4-aminobenzoic acid, 2-aminoanisole-4- and -5-sulfonic acid, 4-aminoanisole-2-and -3-sulfonic acid, 3-chloro-2-amino-3-toluene-5-sulfonic acid, 4-chloro-2-aminotoluene-5-sulfonic acid, 5-chloro-2-aminotoluene-3- and -4-sulfonic acid, 6-chloro-2-aminotoluene-4-sulfonic acid, 6-chloro-3-aminotoluene-4-sulfonic acid, 1-aminobenzene-2, 5-disulfonic acid, 1-aminobenzene-2,4- and -3,5-disulfonic acid, 2-aminotoluene-3,5-disulfonic acid, 2-aminotoluene-4,5- and -4,6-disulfonic acid, 4-aminotoluene-2,5-disulfonic acid, 2-aminonaphthalene-1-sulfonic acid, 2-aminonaphthalene-5-and -6-sulfonic acid, 2-aminonaphthalene-7- and -8- sulfonic acid, 1-aminonaphthalene-2-, -3-, -4-, -5-, -6-, -7- and -8-sulfonic acid, 2-aminonaphthalene-4,8-disulfonic acid, 2-aminonaphthalene-6,8-disulfonic acid, 2-aminonaphthalene-1,5- and -1,7-disulfonic acid, 2-aminonaphthalene-5,7-, -3,6-, -3,7- and -4,7-disulfonic acid, 1-aminonaphthalene-2,4-, -2,5-, -3,6-, -3,7-, -3,8-, -4,6-, -4,7-, -4,8-, -5,7- and -6,8-disulfonic acid, 2-aminonaphthalene-3,6,8-trisulfonic acid, 2- aminonaphthalene-4,6,8- and 1,5,7-trisulfonic acid, 1-aminonaphthalene-2,4,7-trisulfonic acid, 1-aminonaphthalene-2,4,8-, -3,5,7-, -3,6,8- and 4,6,8-trisulfonic acid, in particular 1-amino-4-(β-sulfatoethylsulfonyl)-benzene, 1-amino-3-(β-sulfatoethylsulfonyl)-benzene, 1-amino-2-methoxy-5-(β-sulfatoethylsulfonyl)-benzol 1-amino-2-hydroxy-5-(β-sulfatoethylsulfonyl)-benzol, 1-amino-2-hydroxy-4-(β-sulfatoethylsulfonyl)-benzene, 1-amino-2-methyl-4-(β-sulfatoethylsulfonyl)-benzene, 1-amino-2-methoxy-5-methyl-4-(β-sulfatoethylsulfonyl)-benzene, 1-amino-2,5-dimethoxy-4-(β-sulfatoethylsulfonyl)-benzene, 1-amino-2-methyl-5-methoxy-4-(β-sulfatoethylsulfonyl)-benzene, 2-chloro-1-amino-5-(β-sulfatoethylsulfonyl)-benzene, 2-sulfo-1-amino-5-(β-sulfatoethylsulfonyl)-benzene, 2-carboxy-1-amino-5-(β-sulfatoethylsulfonyl)-benzol, 1- amino-4-chloro-5-(β-sulfatoethylsulfonyl)-benzene, 1-amino-2-bromo-4-(β-sulfatoethylsulfonyl)-benzol, 1-amino-2-(sulfatoethylsulfonyl)-benzene, 1-amino-4-[3'-(β-sulfatoethylsulfonyl)-benzoylamino]-benzene, 2-amino-1-sulfo-6-(β-sulfatoethylsulfonyl)-naphthalene, 2-amino-6-sulfo-8-(β-sulfatoethylsulfonyl)-naphthalene, 1-amino-6-sulfo-4-(β-sulfatoethylsulfonyl)-naphthalene, 1-amino-7-sulfo-5-(β-sulfatoethylsulfonyl)-naphthalene, 1-amino-4-sulfo-6-(β-sulfatoethylsulfonyl)-naphthalene, 1-amino-4-sulfo-7-(β-sulfatoethylsulfonyl)-naphthalene, 2-amino-1-sulfo 5-(β-sulfatoethylsulfonyl)-naphthalene, 2-amino-1,7-disulfo-5-(β-sulfatoethylsulfonyl)-naphthalene, 2-amino-8-sulfo-6-(β-sulfatoethylsulfonyl)-naphthalene, 1-amino-4-(β-sulfatoethylsulfonyl)-naphthalene, 1-amino-5-(β-sulfatoethylsulfonyl)naphthalene, 1-amino-6-(β-sulfatoethylsulfonyl)-naphthalene, 1-amino-7-(β-sulfatoethylsulfonyl)-naphthalene, 1-amino-2-ethoxy-6-(β-sulfatoethylsulfonyl)-naphthalene, 2-amino-5-(β-sulfatoethylsulfonyl)-naphthalene, 2-amino-6-(β-sulfatoethylsulfonyl)-naphthalene, 2-amino-7-(β-sulfatoethylsulfonyl)-naphthalene and 2-amino-8-(β-sulfatoethylsulfonyl)-naphthalene and the corresponding β-thio-sulfatoethylsulfonyl-, β-phosphatoethylsulfonyl-, β-chloroethylsulfonyl, and vinylsulfonyl derivatives.

Compounds conforming to the general formula H—E—NH$_2$ or H—E$_1$(—SO$_2$—Y)—NH$_2$, which can serve for preparing the disazo compounds according to the invention, are for example aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1sulfonic acid, 1,3-diaminobenzene, 1,3-diamino-4-methyl- or -methoxybenzene, 1,3-diaminobenzene-4-sulfonic acid, 1-aminonaphthalene, 1-aminonaphthalene-6- or -7-sulfonic acid, 3-acetylaminoaniline, 2-amino-8-naphthol-6-sulfonic acid, 2-amino-8-naphthol-4,6-disulfonic acid, 2-amino-5-naphthol-7-sulfonic acid, 3-amino-5-naphthol-7-sulfonic acid, 1-amino-5-naphthol-7-sulfonic acid, 1-aminonaphthalene-8-sulfonic acid, 2-methylaniline, 2-methoxyaniline, 3-benzoylaminoaniline, 2,3-dimethylaniline, 3,5-dimethylaniline, 1-amino-2-methoxy-5-acetylaminobenzene, similarly also 1-amino-7-sulfo-5-(β-sulfatoethylsulfonyl)-naphthalene, 1-amino-5-(β-sulfatoethylsulfonyl)-naphthalene, 1-amino-6-(βsulfatoethylsulfonyl)-naphthalene, 1-amino-7-(β-sulfatoethylsulfonyl)-naphthalene, 1-amino-2-ethoxy-6-(β-sulfatoethylsulfonyl)-naphthalene, 2-amino-5-(β-sulfatoethylsulfonyl)-naphthalene, 2-amino-6-(β-sulfatoethylsulfonyl)-naphthalene, 2-amino-7-(β-sulfatoethylsulfonyl)-naphthalene and 2-amino-8(β-sulfatoethylsulfonyl)naphthalene an their correspondoning β-thiosolufatoethylsulfonyl, β-phosphatoethylsulfonyl, β-chloroethylsulfonyl and vinylsulfonyl derivatives.

Further starting compounds which conform to the general formula H—K—NHR$^1$ are for example aniline, 3-methylaniline, 3-chloroaniline, 2,5-dimethylaniline, 2,5-dimethoxyaniline, 3-methoxyaniline, 3-methyl-6-methoxyaniline, 3-aminophenylurea, 3-acetylamino-6-methylaniline, 2-amino-4-acetylaminobenzene-1-sulfonic acid, 1,3-diaminobenzene, 1,3-diamino-4-methyl- or -methoxybenzene, 1,3-diaminobenzene-4-sulfonic acid, 1-aminonaphthalene, 1-aminonaphthalene-6- or -7-sulfonic acid, 3-acetylaminoaniline, 2-amino-8-naphthol-6-sulfonic acid, 2-amino-8-naphthol-4,6-disulfonic acid, 2-amino-5-naphthol-7-sulfonic acid, 3-amino-5-naphthol-7-sulfonic acid, 1-amino-5-naphthol-7-sulfonic acid, 1-aminonaphthalene-8-sulfonic acid, 1-amino-8-naphthol-3,6-disulfonic acid, 1-amino-8-naphthol-4,6-disulfonic acid, 2-methylaniline, 2-methoxyaniline, 3-benzoylaminoaniline, 2,3-dimethylaniline, 3,5-dimethylaniline, 1-amino-2-methoxy-5-acetylaminobenzene, 3-amino-N,N-dimethylaniline, 3-amino-N,N-diethylaniline, 3-amino-N,N-di-β-sulfoethyl)-aniline, 3-amino-N-methyl-N-(β-sulfoethyl)-aniline, N-methylaniline, 3-chloro-N-methylaniline, N-(β-cyanoethyl)-aniline and N-ethylaniline.

Coupling components which according to the invention can serve for preparing the azo compounds of the general formula (1) and which conform to the general formula H—K—Z are for example the following aminonaphtholsulfonic acids to whose (one) amino or methylamino group is bonded the fiber-reactive radical Z$^1$ of the general formula (3a)

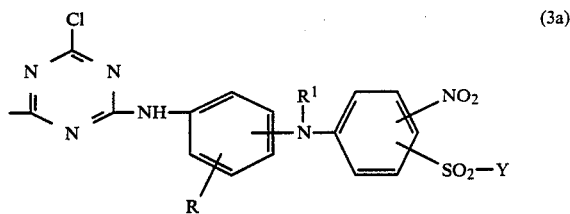
(3a)

in which R, R$^1$ and Y have the abovementioned meanings: 1-amino-3,6-disulfo-8-naphthol, 1-amno-4,6-disulfo-8-naphthol, 2-amino-3,6-disulfo-8-naphthol, 3-amino-6-sulfo-8-naphthol, 3-amino-4,6-disulfo-8-naphthol, 3-methylamino-6-sulfo-8-naphthol, 1-amino-7-sulfo-5-naphthol, 2-amino-6-sulfo-8-naphthol, 1-amino-4-sulfo-8-naphthol, 2-methylamino-6-sulfo-8-naphthol, 2-amino-5-naphthol-7-sulfonic acid, 1-amino-2,4-disulfo-8-naphthol.

Of the azo compounds according to the invention of the general formula (1), emphasis can be given in particular to those groups of compounds which conform to the general formulae (13), (14), (15), (16), (17), (18):

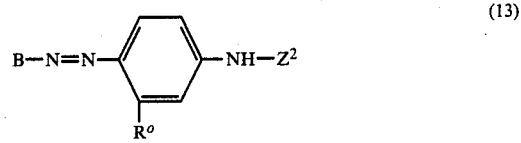
(13)

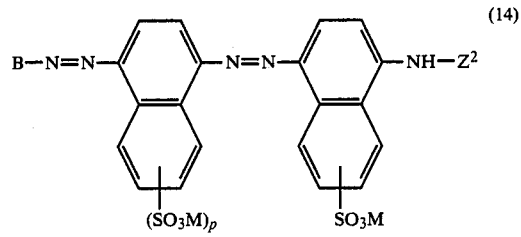
(14)

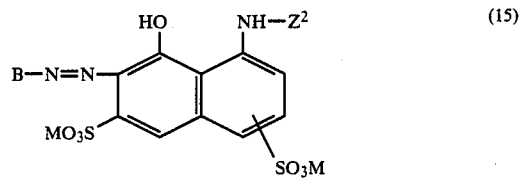
(15)

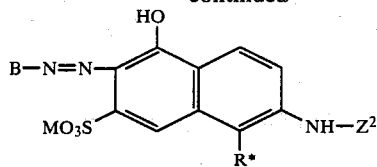

(16)

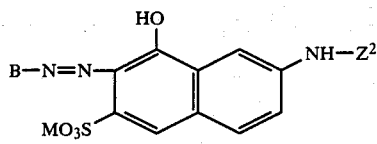

(17)

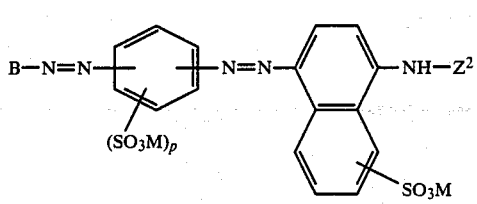

(18)

In these formulae the symbols have the following meanings:

M has the abovementioned meaning:

$Z^2$ is a radical of the general formula (3b)

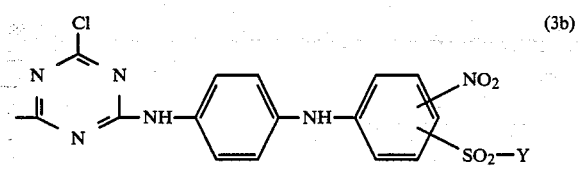

(3b)

in which Y has the abovementioned meaning and the group —$SO_2$—Y and the nitro group are bonded to the benzene nucleus in meta-position relative to each other, but the two are not simultaneously in ortho-position relative to the amino group;

B is a radical of the abovementioned and defined general formula (4b), (4c) or (4d);

p is the number zero, 1 or 2;

R* is a hydrogen atom or a sulfo group;

$R^o$ is a hydrogen atom, a chlorine or bromine atom, an amino group, an alkanoylamino group of 2 to 5 carbon atoms, such as an acetylamino group, a sulfo, carboxyl, methyl, ethyl, methoxy or ureido group.

Particularly preferable in these compounds the formula residue Y is a β-sulfatoethyl group.

Of the compounds of the formula (13), emphasis is to be given in particular to those in which $R^o$ stands for the amino group, the acetylamino, sulfo, methoxy, methyl or ureido group.

Of the compounds of the general formula (15), preference is given in particular to those in which a sulfo group in the formula residue B is bonded to the benzene or naphthalene nucleus in ortho-position relative to the azo group.

In the compounds of the general formula (14), p is preferably the number 1 or 2.

The precipitation and isolation of the compounds of the general formula (1) prepared according to the invention from the synthesis solutions can be effected by commonly known methods, as for example either by precipitating from the reaction medium by means of electrolytes, such as, for example, sodium chloride or potassium chloride, or by evaporating the reaction solution, for example spray-drying, it being possible to add a buffer substance to this reaction solution.

The compounds according to the invention of the general formula (1) have fiber-reactive properties and possess very good dyestuff properties. They can therefore be used for dyeing (including printing) hydroxy- and/or carboxamide-containing materials. It is also possible to use the solutions, obtained in the synthesis of the compounds according to the invention, drectly as a liquid composition, where appropriate after addition of a buffer substance and where appropriate also after concentration, in the dyeing procedures.

The present invention therefore also relates to the use of the compounds according to the invention of the general formula (1) for coloring (including printing) hydroxy- and/or carboxamide-containing materials, i.e. to processes for their application to these substrates. This includes mass coloration, such as, for example, of polyamide films. The materials are preferably treated in the form of fiber materials, in particular in the form of textile fibers, such as yarns, wound packages and fabrics. Herein it is possible to proceed analogously to known ways of processing.

Hydroxy-containing materials are those of natural or synthetic origin, such as, for example, cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose rayon and filament viscose rayon.

Carboxamide-containing materials are for example synthetic and natural polyamides and polyurethanes, in particular in the form of fibers, for example wool and other animal hairs, silk, leather, nylon 66, nylon 6, nylon 11 and nylon 4.

The compounds according to the invention of the formula (1) can be applied and fixed in accordance with the instant invention, on the substrates mentioned, in particular on the fiber materials mentioned, using the application techniques known for water-soluble dyes, in particular fiber-reactive dyes, for example by putting the azo compound of the general formula (1) in dissolved form onto or into the substrate and fixing it thereon or therein, where appropriate through the agency of heat and/or where appropriate through the agency of an alkaline agent. Such ways of dyeing and fixing are numerously described in the literature.

Thus they produce on the cellulose fibers by the exhaust methods from long liquor using various acid-binding agents and where appropriate neutral salts, such as sodium chloride or sodium sulfate, very good color yields and an excellent color buildup. Dyeing is preferably carried out in an aqueous bath at temperatures between 40° and 105° C., where appropriate at temperatures up to 130° C. under pressure, and where appropriate in the presence of customary dyeing auxiliaries. A possible procedure is to introduce the material into the warm bath and gradually to raise the latter to the desired dyeing temperature and to complete the dyeing process at that temperature. The neutral salts which speed up the exhaustion of the dye can if desired also be added to the bath not until the actual dyeing temperature is reached.

The padding processes likewise produce in cellulose fibers good color yields and a good color buildup, customary fixing options being dwelling at room temperature or elevated temperature, for example up to about 60° C., steaming or dry heat.

The customary printing methods for cellulose fibers, which can be carried out in one step, for example by printing with a print paste containing the compound according to the invention and sodium bicarbonate or some other acid-binding agent and subsequent steaming at 100° to 103° C., or in two steps, for example by printing with a neutral or weakly acid print paste which contains the compound according to the invention and subsequent fixing of the compound according to the invention either by passing the printed material through a hot alkali- and electrolyte-containing bath or by overpadding with an alkaline electrolyte-containing padding liquor and subsequent dwelling of this overpadded material or steaming or treatment with dry heat, likewise produce strong prints having well defined outlines and a clear white ground. The outcome of the prints depends only little on varying fixing conditions. Both in dyeing and printing the degrees of fixation obtained with the compounds according to the invention are very high.

Fixing by means of dry heat in the customary thermofixing processes employs hot air at 120° to 200° C. When fixing by means of steam it is possible to use in addition to customary steam at 101° to 103° C. also superheated steam and high-pressure steam at temperatures up to 160° C.

The acid-binding agents which effect fixation of the compound of the formula (1) to the cellulose fibers are for example water-soluble basic salts of alkali metals and alkaline earth metals of organic or inorganic acids or compounds which liberate alkali in heat. There may be mentioned in particular the alkali metal hydroxides and alkali metal salts of weak to medium organic or inorganic acids, preferably their sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass and trisodium phosphate.

By treating the compounds according to the invention (dyes) with the acid-binding agents, where appropriate under the agency of heat, the former are bonded chemically to the cellulose fiber; in particular the cellulose dyeings display, after the customary aftertreatment by rinsing to remove unfixed dye portions, excellent wet-fastness properties, in particular since unfixed dye portions are readily washed off on account of their high solubility in cold water.

The dyeings and prints prepared with the compounds according to the invention (dyes) on cellulose materials possess a high tinctorial strength, good light fastness properties and good to very good wet fastness properties, such as, for example, good to very good wash fastness properties at 60° to 95° C., even in the presence of perborates, acid and alkaline fulling, cross-dyeing and perspiration fastness properties, good to very good acid and alkaline perspiration fastness properties, a high steam resistance, good to very good alkali, acid, water and seawater fastness properties, and also a good pleating fastness, hot press fastness and rub fastness. They also have a very good resistance to acid fading on storing moist dyed material still containing acetic acid (compare German Auslegeschrift No. 2,322,236).

Particularly noteworthy are the good wet light fastness properties of cellulose fiber material dyeings and prints moistened with distilled water or tap water and their alkaline perspiration light fastness. In this respect the dyes according to the invention are surprisingly superior to the known and structurally most comparable fiber-reactive dyes mentioned at the beginning, which contain as a reactive group likewise a monochlorotriazinyl radical and a fiber-reactive group of the vinylsulfonyl series.

Dyeing on polyurethane fibers or natural or synthetic polyamide fibers is customarily carried out from an acid medium. It is thus possible for example to add to the dyebath acetic acid and/or ammonium sulfate, sodium acetate and/or ammonium acetate, in order to obtain the desired pH value. To obtain an acceptable levelness of the dyeing, it is advisable to add customary leveling auxiliaries, based, for example, on a reaction product of cyanuric chloride with three times the molar amount of an aminobenzenesulfonic acid and/or of an aminonaphthalenesulfonic acid or based on a reaction product of for example stearylamine with ethylene oxide. As a rule, the material to be dyed is entered into the bath at a temperature of about 40° C., is agitated therein for some time, the dyebath is then adjusted to the desired weakly acid, preferably weakly acetic acid, pH value, and the actual dyeing is carried out at a temperature between 60° and 98° C. But the dyeing can also be carried out at the boil or at temperatures up to 120° C. (under pressure).

The process of dyeing wool is herein effected in conventional and known manner by subjecting the fiber-reactive compound of the general formula (1) to the exhaustion process under control of the pH value, preferably first from an acid dyebath having a pH of about 3.5 to 5.5, and toward the end of the dyeing time shifting the pH value into the neutral and where appropriate weakly alkali range up to a pH value of 8.5, in order to bring about the full reactive bond between this dye of the formula (1) and the fiber, in particular when high depths of shade are to be obtained. At the same time the portion of the dye which is not reactively bonded is dissolved off.

The method of processing described here is also applicable to preparing dyeings on fiber materials made of other natural polyamides or of synthetic polyamides and polyurethanes. The dyeings are carried out at temperatures of 60° to 100° C., but they can also be effected in sealed dyeing apparatus at temperatures up to 106° C. Since the compounds of the general formula (1) are very readily water-soluble, they can advantageously also be used in conventional continuous dyeing processes. The tinctorial strength of the compounds according to the invention of the general formula (1) is very high. They produce on the fiber materials, in particular in the reactive dyeing of wool, strong, fast, dyeings. On using dyeing temperatures of 100° to 106° C. the bath exhaustion is found to be high.

With the dyeings obtainable with the compounds according to the invention of the general formula (1) it is possible to dispense with an otherwise customary ammoniacal aftertreatment of the dyed material. Compared with structurally similar known dyes, they surprisingly have a very good color buildup where the brilliant hue is retained in deep shades. They are moreover highly compatible with other fiber-reactive wool dyes which permit a surprisingly level dyeing of the fiber. Similarly, material made of wool fibers of different provenances can be dyed level with the compound according to the invention. To improve the leveling behavior it is possible where appropriate to add a customary leveling auxiliary, such as, for example, N-methyltaurine.

The examples below serve to illustrate the invention. The parts and percentages are by weight, unless otherwise stated. Parts by weight relate to parts by volume as the kilogram relates to the liter.

The compounds described in terms of formulae in these examples are shown in the form of the free acids; they are generally prepared and isolated in the form of their sodium or potassium salts and used for dyeing in the form of their salts. The starting compounds and components mentioned in the examples below, in particular the tabled examples, in the form of the free acid can likewise be used in the synthesis as such or in the form of their salts, preferably alkali metal salts, such as sodium or potassium salts.

EXAMPLE 1

56 parts of aniline 4-β-sulfatoethyl sulfone are diazotized in conventional manner in a mixture of 500 parts of icewater and 45 parts of concentrated aqueous hydrochloric acid with 40 parts per volume of aqueous 5 N sodium nitrite solution. The diazonium salt solution is slowly added at a pH value of 5.5 to 6.0° to a solution of the coupling component which is prepared as follows: a solution having a pH value between 4.5 and 5.0 and a temperature between 5° and 10° C. of 62 parts of 1-amino-3,6-disulfo-8-naphthol in 600 parts of water has added to it with stirring 36 parts of cyanuric chloride a little at a time; the pH is held at 2.0 with sodium hydrogencarbonate. Stirring of the batch is continued for an additional 4 hours at a temperature between 5° and 10° C. and a pH value of 2. Stirring is then continued for a further two hours at a pH value between 5.5 and 6 until coupling is complete. 84 parts of 1-nitro-2-(4'-aminophenylamino)-5-(β-sulfatoethylsulfonyl)benzene are then added, and the pH value is maintained between 5.5 and 6 and the reaction temperature at 25° C. and stirring is continued under these conditions for approximately a further 8 hours.

The compound according to the invention is isolated in conventional manner. The result obtained is a red electrolyte-containing powder which contains the sodium salt of the compound of the formula which has very good fiber-reactive dye properties. It has in aqueous solution an absorbtion peak at 515 nm and produces by the application and fixing methods customary in the industry, for example from an aqueous alkaline liquor by the customary exhaustion or padding methods, strong yellowish-red dyes for cotton which have very good fastness properties, in particular very good wash fastness properties.

EXAMPLES 2 TO 15

The table examples below describe further azo compounds according to the invention conforming to a general formula (A)

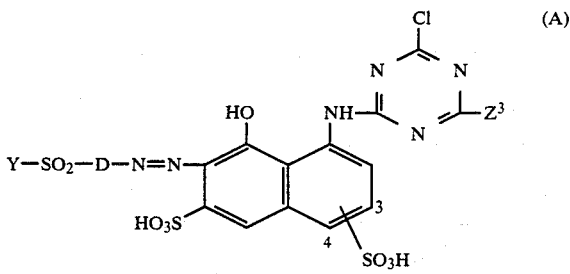

in which D corresponds to the radical of the aromatic amine $Y-SO_2-D-NH_2$ of the diazo component and $Z^3$ to the amino radical of the amino-nitro-diphenylamine of the general formula (8) mentioned in the description. They can be prepared in a manner according to the invention, for example analogously to the above example 1, from the components visible in this formula (such as the diazonium compound of the aromatic amine, the aminonaphtholsulfonic acid, cyanuric chloride and the amino-nitrodiphenylamine compound $H-Z^3$ conforming to the general formula (8). They have very good fiber-reactive dye properties and produce on the materials mentioned in the description, such as in particular cellulose fiber material, by the application methods customary in the art, preferably by the application and fixing methods customary for fiber-reactive dyes, strong dyeings and prints having good fastness properties, such as for example the fastness properties indicated in Example 1, in the hue on cotton sperified in the respective table example.

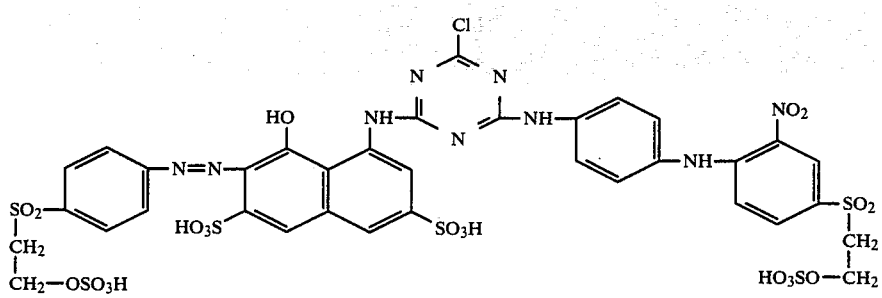

| | Azo compound conforming to the formula (A) | | | |
|---|---|---|---|---|
| Example | Aromatic amine $Y-SO_2-D-NH_2$ | Position of the sulfo group | Amino—diphenylamine $H-Z^3$ conforming to the formula (8) | Hue |
| 2 | 3-(β-sulfatoethylsulfonyl)-aniline | 3- | 1-nitro-2-(4'-amino-phenylamino)-5-(β-sulfato-ethylsulfonyl)-benzene | red |
| 3 | 2-methoxy-5-(β-sulfato-ethylsulfonyl)-aniline | 3- | 1-nitro-2-(4'-amino-phenylamino)-5-(β-sulfato- | red |

-continued

| | Azo compound conforming to the formula (A) | | | |
|---|---|---|---|---|
| Example | Aromatic amine Y—SO$_2$—D-NH$_2$ | Position of the sulfo group | Amino—diphenylamine H—Z$^3$ conforming to the formula (8) | Hue |
| 4 | 2,5-dimethoxy-4-($\beta$-sulfato-ethylsylfonyl)-aniline | 3- | 1-nitro-2-(4'-amino-phenylamino)-5-($\beta$-sulfato-ethylsulfonyl)-benzene | red |
| 5 | 2-carboxy-5-($\beta$-sulfato-ethylsulfonyl)-aniline | 3- | 1-nitro-2-(4'-amino-phenylamino)-5-($\beta$-sulfato-ethylsulfonyl)-benzene | red |
| 6 | 2-sulfo-5-($\beta$-sulfato-ethylsulfonyl)-aniline | 3- | 1-nitro-2-(4'-amino-phenylamino)-5-($\beta$-sulfato-ethylsulfonyl)-benzene | red |
| 7 | 2-bromo-4-($\beta$-sulfato-ethylsulfonyl)-aniline | 3- | 1-nitro-2-(4'-amino-phenylamino)-5-($\beta$-sulfato-ethylsulfonyl)-benzene | red |
| 8 | 1-sulfo-6-($\beta$-sulfo-ethylsulfonyl)-2-amino-naphthaline | 3- | 1-nitro-2-(4'-amino-phenylamino)-5-($\beta$-sulfato-ethylsulfonyl)-benzene | red |
| 9 | 4-($\beta$-sulfatoethylsulfonyl)-aniline | 4- | 1-nitro-2-(4'-amino-phenylamino)-5-($\beta$-sulfato-ethylsulfonyl)-benzene | red |
| 10 | 2-sulfo-5-($\beta$-sulfato-ethylsulfonyl)-aniline | 4- | 1-nitro-2-(4'-amino-phenylamino)-5-($\beta$-sulfato-ethylsulfonyl)-benzene | red |
| 11 | 4-($\beta$-sulfatoethylsulfonyl)-aniline | 3- | 1-nitro-4-(4'-amino-phenylamino)-5-($\beta$-sulfato-ethylsulfonyl)-benzene | red |
| 12 | 2-sulfo-5-($\beta$-sulfato-ethylsulfonyl)-aniline | 3- | 1-nitro-4-(4'-amino-phenylamino)-5-($\beta$-sulfato-ethylsulfonyl)-benzene | red |
| 13 | 3-($\beta$-sulfatoethylsulfonyl)-aniline | 3- | 1-nitro-4-(4'-amino-phenylamino)-5-($\beta$-sulfato-ethylsulfonyl)-benzene | red |
| 14 | 3-($\beta$-sulfatoethylsulfonyl)-aniline | 4- | 1-nitro-4-(4'-amino-phenylamino)-5-($\beta$-sulfato-ethylsulfonyl)-benzene | red |
| 15 | 4-($\beta$-sulfatoethylsulfonyl)-aniline | 4- | 1-nitro-4-(4'-amino-phenylamino)-5-($\beta$-sulfato-ethylsulfonyl)-benzene | red |

EXAMPLES 16 TO 21

The table examples below describe further azo compounds according to the invention conforming to a general formula (B)

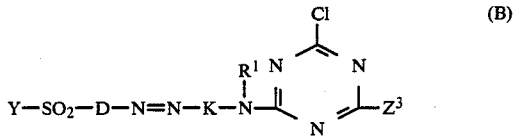

in terms of the aromatic amine Y—SO$_2$—D—NH$_2$ of the diazo component, the radical —K—NHR$^1$ of coupling component and the amino radical Z$^3$ of the aminonitrodiphenylamine of the general formula (8) mentioned in the description. They can be prepared in a manner according to the invention, for example analogously to one of the above examples, from the components visible in the formula (such as the diazonium compound or the aromatic amine, the coupling component, cyanuric chloride and the aminonitro-diphenylamine compound H—Z$^3$ conforming to the general formula (8) mentioned in the description. They have very good fiber-reactive dye properties and produce on the materials mentioned in the description, such as in particular cellulose fiber material, by the application methods customary in the art, preferably by the application and fixing methods customary for fiber-reactive dyes, strong dyeings and prints having good fastness properties, such as for example the fastness properties indicated in example 1, in the hue on cotton specified in the respective table example.

| | Azo compound conforming to the formula (B) | | | |
|---|---|---|---|---|
| Example | Aromatic amine Y—SO$_2$—D-NH$_2$ | Coupling component H—K—NHR | Amino—diphenylamine H—Z$^3$ conforming to the formula (8) | Hue |
| 16 | 5-($\beta$-sulfatoethylsulfonyl)-2-sulfo-aniline | 2-amino-5-naphthol-1-sulfonic acid | 1-nitro-2-(4'-aminophenyl-methylamino)-5-($\beta$-sulfato-ethylsulfonyl)-benzene | orange |
| 17 | 4-($\beta$-sulfatoethylsulfonyl)-aniline | 2-amino-5-naphthol-1,7-disulfonic acid | 1-nitro-2-(4'-aminophenyl-amino)-5-($\beta$-sulfatoethyl-sulfonyl)-benzene | orange |
| 18 | 4-($\beta$-sulfatoethylsulfonyl)-aniline | 3-ureido-aniline | 1-nitro-2-(4'-aminophenyl-amino)-5-($\beta$-sulfatoethyl-sulfonyl)-benzene | golden yellow |
| 19 | 4-($\beta$-sulfatoethylsulfonyl)-aniline | 3-ureido-aniline | 1-nitro-4-(3'-aminophenyl-amino)-5-($\beta$-sulfatoethyl-sulfonyl)-benzene | golden yellow |
| 20 | 4-($\beta$-sulfatoethylsulfonyl)- | 3-ureido-aniline | 1-nitro-2-(4'-aminophenyl- | golden |

| Example | Aromatic amine Y—SO₂—D-NH₂ | Coupling component H—K—NHR | Amino—diphenylamine H—Z³ conforming to the formula (8) | Hue |
|---|---|---|---|---|
| | aniline | | amino)-5-(β-sulfatoethyl-sulfonyl)-benzene | yellow |
| 21 | 4-(β-sulfatoethylsulfonyl)-aniline | 1-naphthylamine-6-sulfonic acid | 1-nitro-2-(4'-aminophenyl-amino)-5-(β-sulfatoethyl-sulfonyl)-benzene | red |

EXAMPLES 22 TO 46

The table examples below describe further azo compounds according to the invention conforming to the general formula (C)

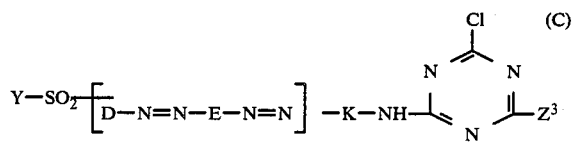

in terms of the diazotizable amino azo compound of the formula Y—SO₂—[D—N=N—E ]—NH₂ which acts as azo component, the coupling component H—K—NH₂ and the amino radical Z³ of the aminonitrodiphenylamine of the general formula (8) mentioned in the description. They can be prepared in a manner according to the invention, for example analogously to the above example, from the components visible in the formula (such as the diazonium compound of the aromatic amino azo compound, the coupling component, cyanuric chloride and the amino-nitro-diphenylamine compound H—Z³ conforming to the general formula (8). They have very good fiber-reactive dye properties and produce on the materials mentioned in the description, such as in particular cellulose fiber materials, by the application methods customary in the art, preferably by the application and fixing methods customary for fiber-reactive dyes, strong dyeings and prints having good fastness properties, such as for example the fastness properties indicated in example 1, in the hue on cotton specified in the respective table example.

| Example | Aminodisazo compound Y—SO₂₊[D-N=N—E]₊NH₂ | Coupling component H—K—NH₂ | Amino—diphenylamine H—Z³ conforming to the formula (8) | Hue |
|---|---|---|---|---|
| 22 | 4-(3'-β-sulfatoethyl-sulfonyl-phenyl-azo)-6-sulfo-1-aminonaphthalene | 1-naphthylamine-8-sulfonic acid | 1-nitro-2-(4'amino-phenylamino)-5-(β-sulfato-ethylsulfonyl)-benzene | brown |
| 23 | 4-(3'-β-sulfatoethyl-sulfonyl-phenyl-azo)-6-sulfo-1-aminonaphthalene | 1-naphthylamine-6-sulfonic acid | 1-nitro-2-(4'amino-phenylamino)-5-(β-sulfato-ethylsulfonyl)-benzene | brown |
| 24 | 4-(3'-β-sulfatoethyl-sulfonyl-phenyl-azo)-6-sulfo-1-aminonaphthalene | 1-naphthylamine-6-sulfonic acid | 1-nitro-4-(4'-aminophenyl-amino)-5-(β-sulfatoethyl-sulfonyl)-benzene | brown |
| 25 | 4-(4'-β-sulfatoethyl-sulfonyl-phenyl-azo)-6-sulfo-1-aminonaphthalene | 1-naphthylamine-8-sulfonic acid | 1-nitro-2-(4'amino-phenyl-amino)-5-(β-sulfatoethyl-sulfonyl)-benzene | brown |
| 26 | 4-(2'-methoxy-5'-β-sulfatoethylsulfonyl-phenyl-azo-6-sulfo-1-aminonaphthalene | 1-naphthylamine-8-sulfonic acid | 1-nitro-2-(4'aminophenyl-amino)-5-(β-sulfatoethyl-sulfonyl)-benzene | brown |
| 27 | 4-(2'-methoxy-5'-β-sulfatoethylsulfonyl-phenyl-azo)-6-sulfo-1-aminonaphthalene | 1-naphthylamine-6-sulfonic acid | 1-nitro-4-(4'aminophenyl-amino)-5-(β-sulfatoethyl-sulfonyl)-benzene | brown |
| 28 | 4-(2'carboxy-5'-β-sulfatoethylsulfonyl-phenyl-azo)-6-sulfo-1-aminonaphthalene | 3-amino-phenyl-urea | 1-nitro-2-(4'-amino-phenyl-amino)-5-(β-sulfatoethyl-sulfonyl)-benzene | brown |
| 29 | 4-(6'sulfo-8'-β- sulfato-ethylsulfonyl-naphthyl-1'-azo)-6-sulfo-1-amino-naphthaline | 1-naphthylamine-8-sulfonic acid | 1-nitro-2-(4'-aminophenyl-amino)-5-(β-sulfatoethyl-sulfonyl)-benzene | reddish-brown |
| 30 | 4-(6'sulfo-8'-β- sulfato-ethylsulfonyl-naphthyl-1'-azo)-6-sulfo-1-amino-naphthaline | 3-methyl-aniline | 1-nitro-2-(4'-aminophenyl-amino)-5-(β-sulfatoethyl-sulfonyl)-benzene | brown |
| 31 | 4-(2'- sulfo-4'-β- sulfato-ethylsulfonyl-phenyl-azo)-2-methyl-5-methoxy-aniline | 3-amino-phenyl-urea | 1-nitro-2-(4'-aminophenyl-amino)-5-(β-sulfatoethyl-sulfonyl)-benzene | yellowish-brown |
| 32 | 4-(2'- sulfo-4'-β- sulfato-ethylsulfonyl-phenyl-azo)-2-methyl-5-methoxy-aniline | 1-naphthylamine-8-sulfonic acid | 1-nitro-2-(4'-aminophenyl-amino)-5-(β-sulfatoethyl-sulfonyl)-benzene | yellowish-brown |
| 33 | 4-(2'methoxy-5'-methyl-4'-β-sulfatoethylsul-fonyl-phenyl-azo)-6-sulfo-1-naphthylamine | 1-naphthylamine-8-sulfonic acid | 1-nitro-2-(4'-aminophenyl-amino)-5-(β-sulfatoethyl-sulfonyl)-benzene | brown |
| 34 | 4-(2'methoxy-5'-methyl- | 3-amimo-phenylurea | 1-nitro-2-(4'-aminophenyl- | yellowish- |

-continued

| | Azo compound conforming to the formula (C) | | | |
|---|---|---|---|---|
| Example | Aminodisazo compound Y—SO₂⫲D-N=N—E⫲NH₂ | Coupling component H—K—NH₂ | Amino—diphenylamine H—Z³ conforming to the formula (8) | Hue |
| | 4'-β-sulfatoethylsulfonyl-phenyl-azo)-6-sulfo-1-naphthylamine | | amino)-5-(β-sulfatoethylsulfonyl)-benzene | brown |
| 35 | 4-(2',5'-dimethoxy-4'-β-sulfatoethylsulfonyl-phenyl-azo)-6-sulfo-1-naphthylamine | 1-naphthylamine-7-sulfonic acid | 1-nitro-2-(4'-aminophenyl-amino)-5-(β-sulfatoethylsulfonyl)-benzene | brown |
| 36 | 4-(2',5'-dimethoxy-4'-β-sulfatoethylsulfonyl-phenyl-azo)-6-sulfo-1-naphthylamine | 1-naphthylamine-8-sulfonic acid | 1-nitro-2-(4'-aminophenyl-amino)-5-(β-sulfatoethylsulfonyl)-benzene | brown |
| 37 | 4-(2',5'-dimethoxy-4'-β-sulfatoethylsulfonyl-phenyl-azo)-6-sulfo-1-naphthylamine | 2,5-disulfo-aniline | 1-nitro-2-(4'-aminophenyl-amino)-5-(β-sulfatoethylsulfonyl)-benzene | yellowish-brown |
| 38 | 4-(4',8'-disulfo-naphthyl-2'-azo)-6-β-sulfatoethylsulfonyl-1-aminonaphthalene | 1-naphthylamine-8-sulfonic acid | 1-nitro-2-(4'-aminophenyl-amino)-5-(β-sulfatoethylsulfonyl)-benzene | Reddish brown |
| 39 | 4-(4',8'-disulfo-naphthyl-2'-azo)-6-β-sulfatoethylsulfonyl-1-aminonaphthalene | 3-methylaniline | 1-nitro-2-(4'-aminophenyl-amino)-5-(β-sulfatoethylsulfonyl)-benzene | brown |
| 40 | 4-(4',8'-disulfo-naphthyl-2'-azo)-6-β-sulfatoethylsulfonyl-1-aminonaphthalene | 3-amino-phenyl-urea | 1-nitro-2-(4'-aminophenyl-amino)-5-(β-sulfatoethylsulfonyl)-benzene | brown |
| 41 | 4-(4',8'-disulfo-naphthyl-2'-azo)-6-β-sulfatoethylsulfonyl-1-aminonaphthalene | 3-amino-phenyl-urea | 1-nitro-4-(4'-aminophenyl-amino)-5-(β-sulfatoethylsulfonyl)-benzene | brown |
| 42 | 4-(4',8'-disulfo-naphthyl-2'-azo)-6-β-sulfatoethylsulfonyl-1-aminonaphthalene | 3-methyl-aniline | 1-nitro-4-(4'-aminophenyl-amino)-5-(β-sulfatoethylsulfonyl)-benzene | brown |
| 43 | 4-(2',5'-disulfo-phenyl-azo)-6-β-sulfatoethylsulfonyl-1-aminonaphthalene | 1-naphthaline-8-sulfonic acid | 1-nitro-2-(4'aminophenyl-amino)-5-(β-sulfatoethylsulfonyl)-benzene | brown |
| 44 | 4-(2',5'-disulfo-phenyl-azo)-6-β-sulfatoethylsulfonyl-1-aminonaphthalene | 3-amino-phenyl-urea | 1-nitro-2-(4'aminophenyl-amino)-5-(β-sulfatoethylsulfonyl)-benzene | yellowish-brown |
| 45 | 4-(2',5'-disulfo-phenyl-azo)-6-β-sulfatoethylsulfonyl-1-aminonaphthalene | 3-methyl-aniline | 1-nitro-4-(4'aminophenyl-amino)-5-(β-sulfatoethylsulfonyl)-benzene | yellowish-brown |
| 46 | 4-(2'-carboxy-5'-β-sulfatoethylsulfonyl-phenyl-azo)-6-sulfo-1-aminonaphthalene | 1-naphthylamine-8-sulfonic acid | 1-nitro-2-(4'aminophenyl-amino)-5-(β-sulfatoethylsulfonyl)-benzene | brown |

We claim:

1. A water-soluble azo compound conforming to the formula $$Y-SO_2-[D-N=N(-E-N=N)_k]-K-Z$$

in which k is the number zero or 1;

D is phenyl which is unsubstituted or is substituted by 1, 2 or 3 substituents selected from the group of substituents consisting of alkyl of 1 to 4 carbon atoms, alkoxy of 1 to 4 carbon atoms, carboxy, alkanoylamino of 2 to 5 carbon atoms which is unsubstituted or is substituted by chloro, bromo, sulfo, sulfato, carboxy or hydroxy, sulfo-benzoylamino, benzoylamino, phenylamino, sulfo-phenylamino, carbamoyl, carbamoyl which is monosubstituted or disubstituted by alkyl of 1 to 4 carbon atoms, sulfamoyl, sulfamoyl which is mono- substituted or disubstituted by alkyl of 1 to 4 carbon atoms, N-phenylsulfamoyl, N-phenyl-N-(C₁–C₄-alkyl)-sulfamoyl, cyano, nitro, chlorine, bromine, fluorine, trifluoromethyl, hydroxy and sulfo, or D is a naphthyl which is unsubstituted or is substituted by 1, 2 or 3 substituents selected from the group of substituents consisting of sulfo, carboxy, methyl, ethyl, methoxy, ethoxy, alkanoylamino of 2 to 5 carbon atoms which is unsubstituted or is substituted by chloro, bromo, sulfo, sulfato, carboxy or hydroxy, sulfobenzoylamino, benzoylamino, chlorine, hydroxy and nitro, or D is phenyl which is substituted by the group—SO₂—Y shown and except as shown is otherwise unsubstituted or is further substituted by 1 or 2 substituents selected from the group of substituents consisting of alkyl of 1 to 4 carbon atoms, alkoxy of 1 to 4 carbon atoms, carboxy, alkanoylamino of 2 to 5 carbon atoms which is unsubstituted by chloro, bromo, sulfo, sulfato, carboxy or hydroxy, sulfobenzoylamino, benzoylamino, phenylamino, sulfophenylamino, carbamoyl, carbamoyl which is monosubstituted or disubstituted by alkyl or 1 to 4 carbon atoms, sulfamoyl, sulfamoyl which is monosubstituted or disubstituted with alkyl of 1 to 4 carbon atoms, N-phenylsulfamoyl, N-phenyl-N-($C_1$-$C_4$-alkyl)sulfamoyl, cyano, nitro, chlorine, bromine, fluorine, trifluoromethyl, hydroxy and sulfo, or D is a naphthyl which is substituted by the group —$SO_2$—Y shown and except as shown is otherwise unsubstituted or is further substituted by 1 or 2 substituents selected from the group of substituents consisting of sulfo, carboxy, methy, ethyl, methoxy, ethoxy, alkanoylamino of 2 to 5 carbon atoms which is unsubstituted or is substituted by chloro, bromo, sulfo, sulfato, carboxy, or hydroxy, sulfobenzoylamino, benzoylamino, chlorine, hydroxy and nitro;

E is phenylene which is unsubstituted or is substituted by 1 or 2 substituents which are selected from the group cosnisting of 2 alkyl of 1 to 4 carbon atoms, 2 alkoxy of 1 to 4 carbon atoms, 2 chlorine, 1 bromine, 1 alkanoylamino of 2 to 5 carbon atoms which is unsubstituted or is substituted by chloro, bromo, sulfo, sulfato, carboxy or hydroxy, 1 benzoylamino, 2 sulfo, 1 carboxy, 1 N,N-dialkylamino having alkyl groups of 1 to 4 carbon atoms each, 1 ureido, 1 phenylureido and 1 alkylsulfonylamino of 1 to 4 carbon atoms, or is a naphthylene which is unsubstituted or is substituted by 1 or 2 sulfo or by 1 alkyl of 1 to 4 carbon atoms, 1 nitro, 1 alkanoylamino of 2 to 5 carbon atoms or 1 benzoylamino or by the group —$SO_2$—Y shown, or is substituted or unsubstituted by the group —$SO_2$—Y shown and by 1 or 2 sulfos and 1 alkyl of 1 to 4 carbon atoms, 1 nitro, 1 alkylamino of 2 to 5 carbon atoms or 1 benzoylamino, or represents a naphthylene which contains bonded in the orthoposition relative to the azo which is also linked with D, an amino, an alkylamino of 1 to 4 carbon atoms or phenylamino unsubstituted or substituted by substituents selected from the group of substituents consisting of chlorine, alkyl of 1 to 4 carbon atoms, alkoxy of 1 to 4 carbon atoms, sulfo and carboxy, or a hydroxy group, and which is further unsubstituted or additionally substituted by 1 or 2 sulfos or 1 alkyl of 1 to 4 carbon atoms, 1 nitro or 1 alkanoylamino of 2 to 5 C-atoms or additionally by 1 or 2 sulfos and 1 alkyl of 1 to 4 carbon atoms, 1 nitro or 1 alkanoylamino of 2 to 5 carbon atoms; the —$SO_2$—Y being mandatorily bonded to a carbon atom of an aromatic ring of D or of an aromatic ring of E or of a benzene ring of a substituent of D;

K is a 1-hydroxynaphthylene which contains the azo bonded in the 2-position, or is a 2-hydroxynaphthylene which contains the azo bonded in the 1-position, both of which are otherwise unsubstituted or are further substituted by 1 or 2 sulfos or by 1 alkanoylamino of 2 to 5 carbon atoms which is unsubstituted or is substituted by chloro, bromo, sulfo, sulfato, carboxy or hydroxy or 1 benzoylamino or by 1 or 2 sulfos and 1 substituted alkanoylamino of 2 to 5 carbon atoms which is unsubstituted or is substituted by chloro, bromo, sulfo, sulfato, carboxy or hydroxy, or 1 benzoylamino, or K is a naphthylene which is unsubstituted or substituted by 1 or 2 sulfos, or by 1 or 2 sulfos and 1 unsubstituted or monosubstituted or disubstituted amino group, the substituents of the amino groups being selected from the group of substituents consisting of alkyl of 1 to 4 carbon atoms, hydroxylalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyls of 1 to 4 carbon atoms each, phenylalkyl having an alkyl group of 1 to 4 carbon atoms; the phenyl of said phenylalkyl being unsubstituted or substituted by one or more of the following: methyl, ethyl, methoxy, ethoxy, chlorine, sulfo, and carboxy; phenyl and phenyl which is substituted by one or more of the following: alkyl of 1 to 4 carbon atoms, alkoxy of 1 to 4 carbon atoms, chlorine, carboxy, 2nd sulfo; or K is a 1-aminonaphthylene which contains the azo bonded to its 2-position or is a 2-aminonaphthylene which contains the azo bonded to its 1-position, said aminonaphthylene radicals being unsubstituted or substituted by 1 or 2 sulfos or by 1 hydroxy in the 5-, 6-, 7- or 8-position or by this hydroxy and 1 or 2 sulfos, or K is a phenylene which is unsubstituted or is substituted by 1 or 2 substituents selected from the group of substituents consisting of 2 alkyls of 1 to 4 carbon atoms, 2 alkoxys of 1 to 4 carbon atoms, 2 chlorines, 1 bromine, 1 alkanoylamino of 2 to 5 carbon atoms which is unsubstituted or substituted by chloro, bromo, sulfo, sulfato, carboxy or hydroxy, 1 benzoylamino, 1 sulfo, 1 carboxy, 1 ureido, 1 phenylureido, 1 alkylsulfonylamino of 1 to 4 carbon atoms, 1 amino and 1 monosubstituted or disubstituted amino whose substituents are alkyl of 1 to 4 carbon atoms, hydroxylalkyl of 1 to 4 carbon atoms, carboxyalkyl of 2 to 5 carbon atoms, sulfoalkyl of 1 to 4 carbon atoms, sulfatoalkyl of 1 to 4 carbon atoms, cyanoalkyl of 2 to 5 carbon atoms, carbalkoxyalkyl having alkyls of 1 to 4 carbon atoms each, phenylalkyl having an alkyl group of 1 to 4 carbon atoms, the phenyl of said phenylalkyl being unsubstituted or substituted by methyl, ethyl, methoxy, ethoxy, hlorine, carboxy, sulfo or combinations thereof, phenyl and phenyl which is substituted by one or more of the more of the following: alkyl of 1 to 4 carbon atoms, chlorine, carboxy, and sulfo;

Y is vinyl or β-thiosulfatoethyl, β-phosphatoethyl, β-chloroethyl or β-sulfatoethyl;

Z is a radical of the formula

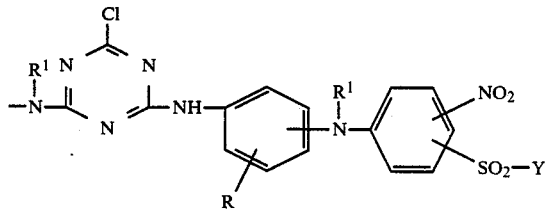

in which

R[1] stands for hydrogen or alkyl of 1 to 4 carbon atoms unsubstituted or substituted by one or two substituents selected from the group consising of acetylamino, hydroxy, sulfato, alkoxy of 1 to 4 carbon atoms, sulfo and carboxy, wherein the two R[1]s are identical to or different from each other, R denotes hydrogen or sulfo and Y has the above-mentioned meaning, and the two Ys are identical to or different from each other.

2. A compound as claimed in claim 1 of the formula

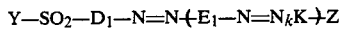

in which

D₁ is phenylene which is unsubstituted or substituted by 1 or 2 substituents selected from the group of substituents consisting of alkyl of 1 to 4 carbon atoms, alkoxy of 1 to 4 carbon atoms, carboxy, alkanoylamino of 2 to 5 carbon atoms which is unsubstituted or substituted by chloro, bromo, sulfo, sulfato, carboxy or hydroxy, sulfobenzoylamino, benzoylamino, phenylamino, sulfophenylamino, carbamoyl, carbamoyl which is monosubstituted or disubstituted by alkyl of 1 to 4 carbon atoms, sulfamoyl, sulfamoyul which is monosubstituted or disubstituted by alkyl of 1 to 4 carbon atoms, N-phenylsulfamoyl, N-phenyl-N-(C₁-C₄-alkyl)-sulfamoyl, cyano, nitro, chlorine, bromine, fluorine, trifluoromethyl, hydroxy and sulfo, or D₁ is a naphthylene which is unsubstituted or substituted by 1 or 2 substitutents selected from the group of substituents consisting of sulfo, carboxy, methyl, ehtyl, methoxy, ethoxy, alkanoylamino which is unsubstituted or substitued by chloro, bromo, sulfo, sulfato, carboxy or hydroxy, sulfobenzoylamino, benzoylamino, chlorine, hydroxy and nitro, and E₁ is a phenylene which is unsubstituted or substituted by 1 or 2 substituents which are selected from the group consisting of 2 alkyls of 1 to 4 carbon atoms, 2 alkoxys of 1 to 4 carbon atoms, 2 chlorines, 1 bromine, 1 alkanoylamino of 2 to 5 carbon atoms which is unsubstituted or substituted by chloro, bromo, sulfo, sulfato, carboxy or hydroxy, 1 benzoylamino, 2 sulfo, 1 carboxy, 1 N, N-dialkylamino having alkyls of 1 to 4 carbon atoms each, 1 ureido, 1 phenylureido and 1 alkylsulfonylamino of 1 to 4 carbon atoms, or denotes naphthalene which is unsubstituted or substituted by 1 or 2 sulfos or by 1 alkyl group of 1 to 4 carbon atoms, 1 nitro, 1 alkanoylamino of 2 to 5 carbon atoms or 1 benzoylamino, or by 1 or 2 sulfos and 1 alkyl of 1 to 4 carbon atoms, 1 nitro, 1 alkanoylamino of 2 to 5 carbon atoms or 1 benzoylamino, or represents a naphthalene which contains bonded in the ortho-position relative to the azo which is also linked with D, an amino, an alkylamino of 1 to 4 carbon atoms or phenylamino unsubstituted or substituted by substituents selected from the group of substitutents consisting of chlorine, alkyl of 1 to 4 carbon atoms, alkoxy of 1 to 4 carbon atoms, sulfo and carboxy, or hydroxy and no additional substituents or the following additional substitutents: 1 or 2 sulfos or 1 alkyl of 1 to 4 carbon atoms, 1 nitro, 1 alkanoylamino of 2 to 5 carbon atoms which is unsubstituted or substituted by chloro, bromo, sulfo, sulfato, carboxy, or hydroxy, or 1 benzoylamino, or additionally by 1 or 2 sulfos and 1 alkyl of 1 to 4 carbon atoms, 1 nitro, 1 alkanoylamino of 2 to 5 carbon atoms which is unsubstituted or substituted by bromo, sulfo, sulfato, chloro, carboxy or hydroxy, or 1 benzoylamino.

3. A compound as claimed in claim 2 wherein D₁ is a phenylene which is unsubstituted or substituted by 1 or 2 substituents from the group consisting of alkyl of 1 to 4 carbon atoms, alkoxy of 1 to 4 carbon atoms, chlorine, carboxy and sulfo, or is naphthylene which is unsubstituted or substituted by 1 or 2 sulfos.

4. A compound as claimed in claim 2 wherein D₁ is a radical of the formula:

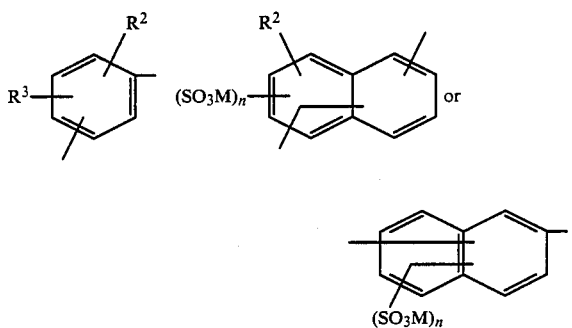

in which

R² is hydrogen, an alkyl of 1 to 4 carbon atoms, alkoxy of 1 to 4 carbon atoms, chlorine or carboxy, R³ is hydrogen, alkyl of 1 to 4 carbon atoms, alkoxy of 1 to 4 carbon atoms, chlorine or sulfo, M denotes hydrogen or an alkali metal and n stands for the number 1 or 2.

5. A compound as claimed in claim 2 wherein k denotes the number 1 and E is a 1-hydroxynaphthylene which contains the azo radical bonded in the 2-position and is substituted by 1 or 2 sulfo groups -or is the 1, 4-phenylene which is unsubstituted or substituted by amino, alkylamino of 1 to 4 carbon atoms, alkanoylamino of 2 to 5 carbon atoms, methyl, ethyl, carboxy, sulfo or ureido or chlorine or by these substituents and a methyl, ehtyl, methoxy, ethoxy or sulfo or chlorine, or is a 1,4-naphthylene which is unsubstituted or substituted by one or more of the following: alkanoylamino of 2 to 5 carbon atoms, benzoylamino, and 1 or 2 sulfos.

6. A compound as claimed in claim 1 wherein R¹ is hydrogen or methyl or ethyl.

7. A compound as claimed in claim 1 conforming to the formula

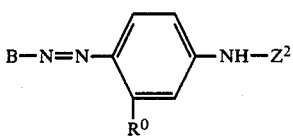

in which B is a radical of the formula:

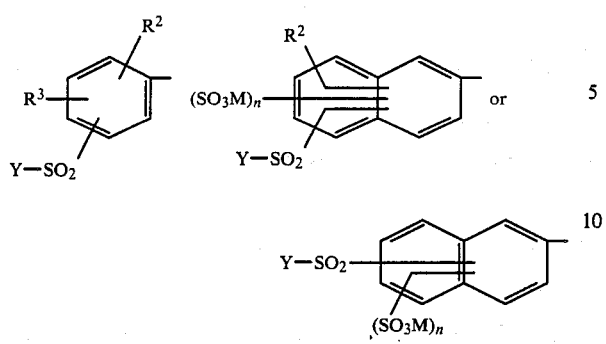

in which
- $R^2$ denotes bromine, nitro or alkanoyl-amino of 2 to 5 carbon atoms, hydrogen, alkyl of 1 to 4 carbon atoms, alkoxy of 1 to 4 carbon atoms, chlorine or carboxy,
- $R^3$ is bromine or hydroxy or hydrogen, alkyl of 1 to 4 carbon atoms, alkoxy of 1 to 4 carbon atoms, chlorine or sulfo,
- $R^o$ is hydrogen, chlorine or bromine, amino, alkanoylamino of 2 to 5 carbon atoms, sulfo, carboxy, methyl, ethyl, methoxy or ureido;
- $Z^2$ is a radical of the formula

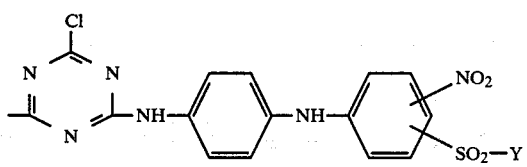

and the —$SO_2$—Y and the nitro are bonded to the benzene ring in meta-position relative to each other, but they are not both at the same time in ortho-position to the amino.

8. A compound according to claim 1 having the formula

in which B is a radical of the formula

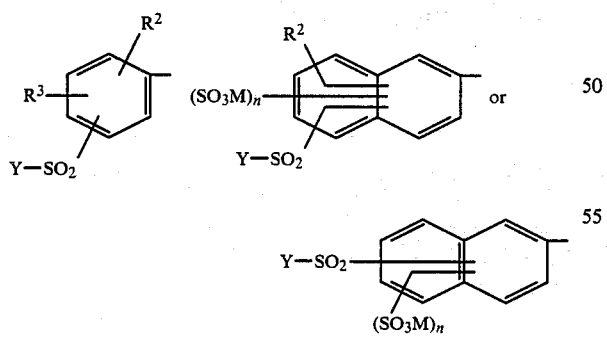

in which
- $R^2$ denotes bromine, nitro or alkanoyl-amino of 2 to 5 carbon atoms, hydrogen, alkyl of 1 to 4 carbon atoms, alkoxy of 1 to 4 carbon atoms, chlorine or carboxy,
- $R^3$ is bromine or hydroxy or hydrogen, alkyl of 1 to 4 carbon atoms, alkoxy of 1 to 4 carbon atoms, chlorine or sulfo, $Z^2$ is a radical of the formula

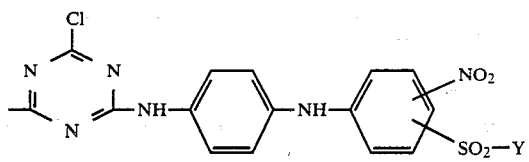

and the —$SO_2$—Y and the nitro are bonded to the benzene ring in meta-position relative to each other, but they are not both at the same time in ortho-position to the amino.

9. A compound as claimed in claim 8 of the formula

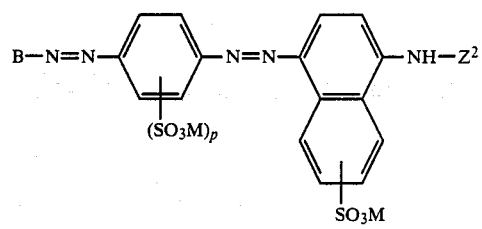

in which M stands for hydrogen or an alkali metal and p is the number zero, 1 or 2.

10. A compound as claimed in claim 8 of the formula

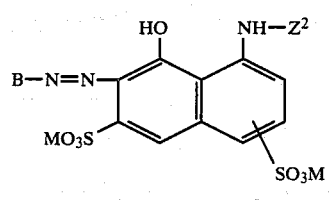

in which M denotes hydrogen or an alkali metal.

11. A compound as claimed in claim 8 of the formula

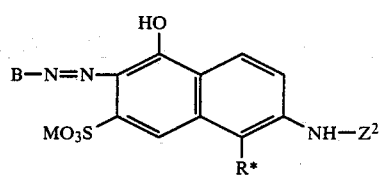

in which M stands for hydrogen or alkali metal and R* is hydrogen or sulfo.

12. A compound as claimed in claim 8 of the general formula

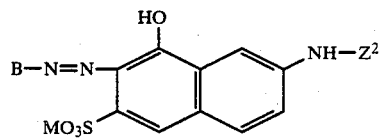

in which M stands for hydrogen or an alkali metal.

13. A compound as claimed in claim 8 of the general formula

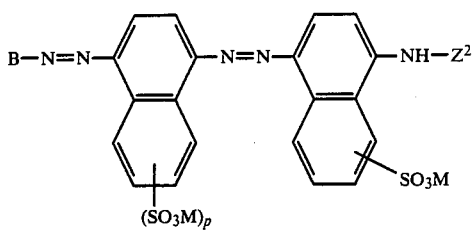

in which M stands for hydrogen or an alkali metal and p is the number zero, 1 or 2.

14. A compound as claimed in claim 1, in which Z is a group of the formula

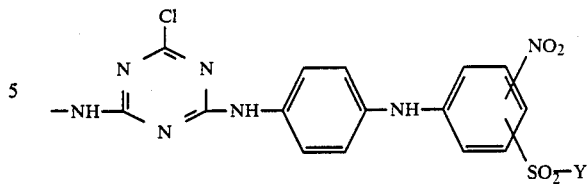

in which the —$SO_2$—Y and the nitro are bonded to the benzene nucleus in meta-position relative to each other but both are not bonded at the same time in the ortho-position to the amino.

15. A compound as claimed in claim 1, wherein Y is vinyl or β-sulfato-ethyl.

16. A compound as claimed in claim 2, in which Y is vinyl or β-sulfato-ethyl.

17. A compound as claimed in claim 1, in which Y is β-sulfato-ethyl.

18. A compound as claimed in claim 2, in which Y is β-sulfato-ethyl.

* * * * *

UNITED STATES PATENT AND TRADEMARK OFFICE
CERTIFICATE OF CORRECTION

PATENT NO. : 4,731,441
DATED : March 15, 1988
INVENTOR(S) : Marcos Segal, Michael Kunze It is certified that error appears in the above-identified patent and that said Letters Patent is hereby corrected as shown below:

Claim 2 (column 29, line 12), the formula should read:

The formula of claim 8 (column 31) should read as follows:

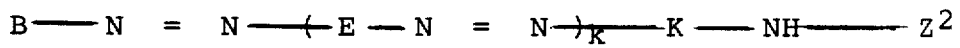

In column 28, line 52, delete the words "of the more".

In column 27, line 15 "methy" should read --methyl--.

In column 29, line 26, "sulfamoyul" should read --sulfamoyl--

In column 29, line 34 and column 30, line 49, "ehtyl" --ethyl--.

Signed and Sealed this

Third Day of January, 1989

Attest:

DONALD J. QUIGG

Attesting Officer   Commissioner of Patents and Trademarks